June 1, 1937.    K. MUENZ    2,082,021
AUTOMATIC BRAKE ADJUSTING MECHANISM
Filed Jan. 26, 1934
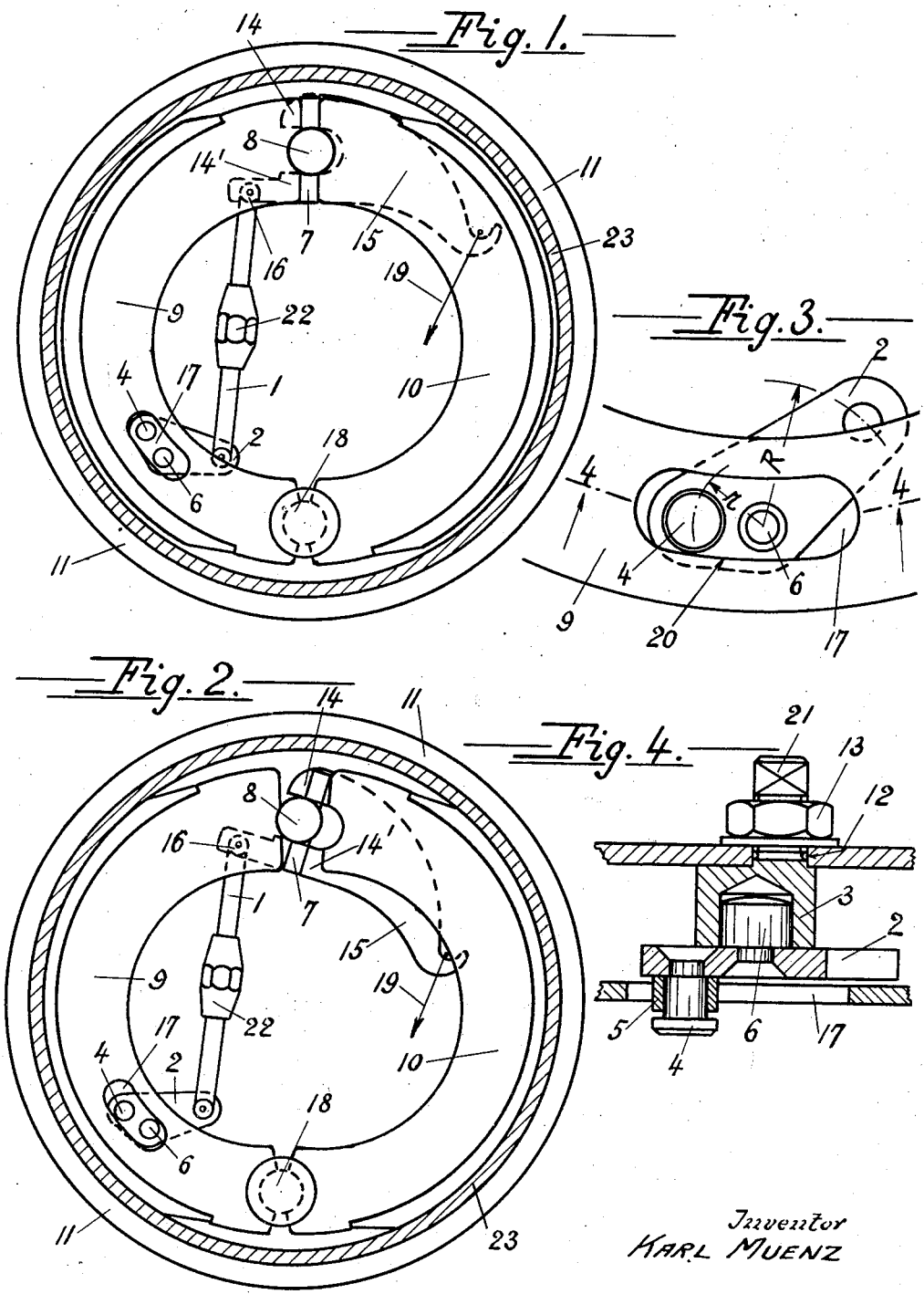
Inventor
KARL MUENZ
per Karl A. Mayr
Attorney Patented June 1, 1937

2,082,021

UNITED STATES PATENT OFFICE 2,082,021

AUTOMATIC BRAKE ADJUSTING MECHANISM

Karl Muenz, Mannheim-Friedrichsfeld, Germany, assignor to Deutsche Perrot-Bremse G. m. b. H., Mannheim-Friedrichsfeld, Germany Application January 26, 1934, Serial No. 708,391
In Germany January 31, 1933

12 Claims. (Cl. 188—78)

This invention relates to an automatic brake adjusting mechanism, more particularly to an automatic adjusting mechanism for car brakes of the twin block type operating in both directions of rotation.

As a rule, such brakes have an excessive wear on one side, and it is essential to make provisions which maintain the clearance between the blocks and the brake drum and equalize this clearance over the whole circumference of the brake. Hand adjustment is not sufficient as it takes time, requires skilled labor and is difficult to carry out with the required accuracy.

An object of this invention is the provision of a brake adjusting mechanism automatically assuring equal clearance between brake blocks and brake drum over the whole circumference of the brake at all operation conditions and at all conditions of wear.

Another object of this invention resides in the provision of an automatic brake adjusting mechanism, the action of which can easily be manually changed and readjusted.

An object of this invention resides in the provision of an automatic brake adjusting mechanism having conveniently accessible means for changing and readjusting its action and operating efficiency.

Further and other objects of the present invention will be hereinafter set forth in the accompanying specification and claims and shown in the drawing which, by way of illustration, shows what I now consider to be a preferred embodiment of my invention.

In the drawing:

Fig. 1 is a diagrammatic front view of a brake mechanism in rest position having new brake blocks and being equipped with my new self-adjusting mechanism.

Fig. 2 is a diagrammatic front view of a brake mechanism in operating position having worn brake blocks and being equipped with my new self-adjusting mechanism.

Fig. 3 is a diagrammatic view of a detail of my new self-adjusting mechanism on a large scale.

Fig. 4 is a cross section through the detail shown in Fig. 3 and taken along line 4—4 in Fig. 3.

In the drawing like parts are designated by like numerals.

The self-adjusting eccentric control mechanism according to this invention consists of the following parts:

1 is a control rod movably linked to the control lever 2 which is revolvable around the pivot 6 revolvably carried by the mother bolt 3; the latter is provided with a trunk bolt 21 which is eccentric with respect to the axis of the pivot 6 and is inserted in aperture 12 of the base- or cover-plate 11 and held to said plate by means of the nut 13. The lever 2 carries the roller bolt 4 having a revolvable bushing 5. This bushing internally engages the eye 17 of the block reinforcement plate 9. The control rod 1 consists of two parts which are connected by means of an elongated nut 22 having a left and a right hand internal thread cooperating with a left and a right hand thread on the ends of the two parts which, together with the nut 22, make up the control rod 1. By turning the nut 22, the length of the rod can be changed. This turning can also be accomplished from a remote point by providing a simple transmission mechanism for turning the nut 22. Any other means well known in the art may be provided to adjust the position of the bolt 4 with respect to the operated end 16 of the control rod 1. The brake key lever 7 is mounted on the prongs 14 and 14' of the fork of the main brake lever 15; inner prong 14' is longer than the outer prong 14 and is equipped with a pivot 16 revolvably carrying the control rod 1. 18 is a link movably connecting the blocks 9 and 10.

The operation of the device is as follows:

Upon pulling the main brake lever 15 in the direction of the arrow 19, said lever turns clockwise, and the key 7 spreads the brake blocks 10 and 9 apart whereby the blocks 10 and 9 consecutively engage the brake drum 23. When the brake lever 15 is turned clockwise, the control rod 1 is pulled upward at the same time and brought to the position indicated on Fig. 2 thereby turning the control lever 2 in a counter-clockwise direction around the stationary bolt 6 and moving the roller bushing 5 outward. Depending on the dimensions of the control rod 1 and/or lever 2, particularly the radii R and r shown in Fig. 3, and the configuration of the eye 17, the bushing 5 will engage the outer part 20 of the eye and move the brake plate 9 outward, or there will still be a little clearance between the bushing 5 and the part 20 of the eye 17. By proper dimensioning, it is possible to adjust the control in such a way that, during the braking operation, the block 9 engages the brake drum before block 10 engages the brake drum. If there is no adjusting mechanism according to my invention, block 10 always engages the brake drum first.

A careful placing of the brake blocks concentrically within the brake drum can easily be accomplished by adjusting the bolt 3 which revolvably carries the pivot 6 of the lever 2 and is mounted to the base plate 11 by way of the bolt part 21 which is part of the bolt 3 but eccentric with respect to the axis of pivot 6. Since the bolt 21 is easily accessible from the outside, adjustment of the concentricity of the brake blocks and brake drum is an easy matter.

While I believe the above described embodiments of my invention to be preferred embodiments, I wish it to be understood that I do not desire to be limited to the exact details of process, design and construction shown and described, for obvious modifications will occur to a person skilled in the art.

What I claim is:

1. A brake mechanism comprising a brake drum, a back plate having an inner side facing the brake mechanism proper and an outer side, a spreadable brake member adapted to move substantially circularly within said drum, a spreading mechanism adapted to spread said brake member apart which thereby engages said drum, an auxiliary device substantially located on the inner side of said back plate and movably connected to said spreading mechanism and adapted to movably engage said brake member at one point only and a pivot associated with said back plate and adapted to rotatably hold said auxiliary device, said pivot comprising adjusting means extending through said back plate for adjusting the location of the center of rotation of said device with respect to said brake member.

2. Brake mechanism comprising a back plate having an inner side facing the brake mechanism proper and an outer side, at least two brake shoes, a spreading mechanism adapted to spread said shoes apart and thereby engage the brake, an auxiliary device substantially located on the inner side of said back plate and operatively linked to said spreading mechanism and adapted to slidingly engage one of said brake shoes, a pivot rotatably holding said auxiliary device and an adjusting bolt eccentrically attached to said pivot and extending through and being rotatably accessible from the outer side of said back plate, the center of said pivot determining the center of rotation of said auxiliary device being adjustable as to its position with respect to said slidably engaged brake shoe by turning said bolt.

3. A brake mechanism comprising a brake drum, a back plate having an inner side facing the brake mechanism proper and an outer side, a spreadable brake member adapted to move circularly within said drum, a spreading mechanism adapted to spread said member apart which thereby engages said drum, an auxiliary device comprising a bell crank lever having two arms, one arm being operatively linked to said spreading mechanism and the other arm movably engaging said brake member, a pivot rotatably holding said lever and being adjustably mounted to said back plate and permitting adjustment of the location of the pivot center.

4. In a brake mechanism consisting substantially of a drum, a brake member adapted to move substantially circularly within said drum, an operating mechanism adapted to cause engagement of said brake member and said drum, and a centring mechanism movably interlocked with and adapted to be operated by and to respond to the movements of said operating mechanism and to supplementarily engage said brake member, substantially as described.

5. In a brake mechanism consisting substantially of a drum, a brake member adapted to move substantially circularly within said drum, and an operating mechanism adapted to cause engagement of said brake member and said drum, a centring mechanism and connecting means for movably connecting said centring mechanism with said operating mechanism, said means comprising adjusting means adapted to adjust the concentricity of said brake member with respect to said brake drum, substantially as described and as, and for, the purposes set forth.

6. A brake mechanism consisting substantially of a back plate, a brake drum, two brake shoes movably hinged to one another and adapted to circularly move within said drum, a spreading mechanism consisting substantially of an operating lever rotatably supported by a stationary pivot mounted to said back plate, said lever having means spreadingly cooperating with both of said brake shoes, and a centring mechanism connected to said lever and adapted to movably engage one, and only one, of said shoes and to assure concentricity of said drum and said shoes at all operating conditions.

7. A brake mechanism consisting substantially of a brake drum, two brake shoes movably hinged to one another and adapted to float substantially circularly within said drum, a spreading mechanism consisting substantially of an operating lever rotatably supported by a stationary pivot and having means spreadingly cooperating with both of said brake shoes, a centring mechanism consisting substantially of a lever revolvably supported by a stationary pivot and adapted to engage one, and only one, of said brake shoes, and connecting means movably connecting said operating lever and said second-mentioned lever.

8. An automatic centring mechanism for a twin shoe brake system in which the brake shoes are adapted to move substantially circularly within the brake drum and having a main brake lever operatively engaging the twin shoes, said centring mechanism consisting substantially of a control rod movably linked to said brake lever and a control lever operatively connected to said control rod and adapted to movably engage one, and only one, of said twin shoes and to thereby adjust the concentricity of the brake system within the drum.

9. An automatic centring mechanism for a twin shoe brake system in which the brake shoes are adapted to move substantially circularly within the brake drum and having a main brake lever operatively engaging the twin shoes, said centring mechanism consisting substantially of a control rod movably linked to said brake lever and a control mechanism operatively connected with said control rod and adapted to engage one, and only one, of said twin shoes and to thereby center both shoes.

10. An automatic centring mechanism for a brake system in which the brake member is adapted to move substantially circularly within the brake drum and which has a main brake lever operatively engaging the brake member, said centring mechanism consisting substantially of a control rod movably linked to said brake lever and a control mechanism operatively connected to said control rod and adapted to control the concentricity of the brake member by movably engaging one, and only one, point of the brake member.

11. An automatic centring mechanism for a brake system in which the brake member is adapted to move substantially circularly within the brake drum and which has a main brake lever operatively engaging the brake member, said centring mechanism consisting substantially of a control rod movably linked to said brake lever and a control mechanism operatively connected to said control rod and adapted to control the operation of the brake member by movably engaging one, and only one, point of the brake member, said control rod being adjustable as to its length.

12. In a brake mechanism consisting substantially of a drum, a brake member adapted to move substantially circularly within said drum, an operating mechanism adapted to cause engagement of said brake member and said drum, and a centring mechanism and link means for directly connecting said centring mechanism and said operating mechanism, said centring mechanism responding to the movements of said operating mechanism and supplementarily engaging said brake member, substantially as described.

KARL MUENZ.